June 16, 1936. H. J. SMITH 2,044,128
WEATHER INTEGRATOR
Filed Feb. 24, 1933 2 Sheets-Sheet 1
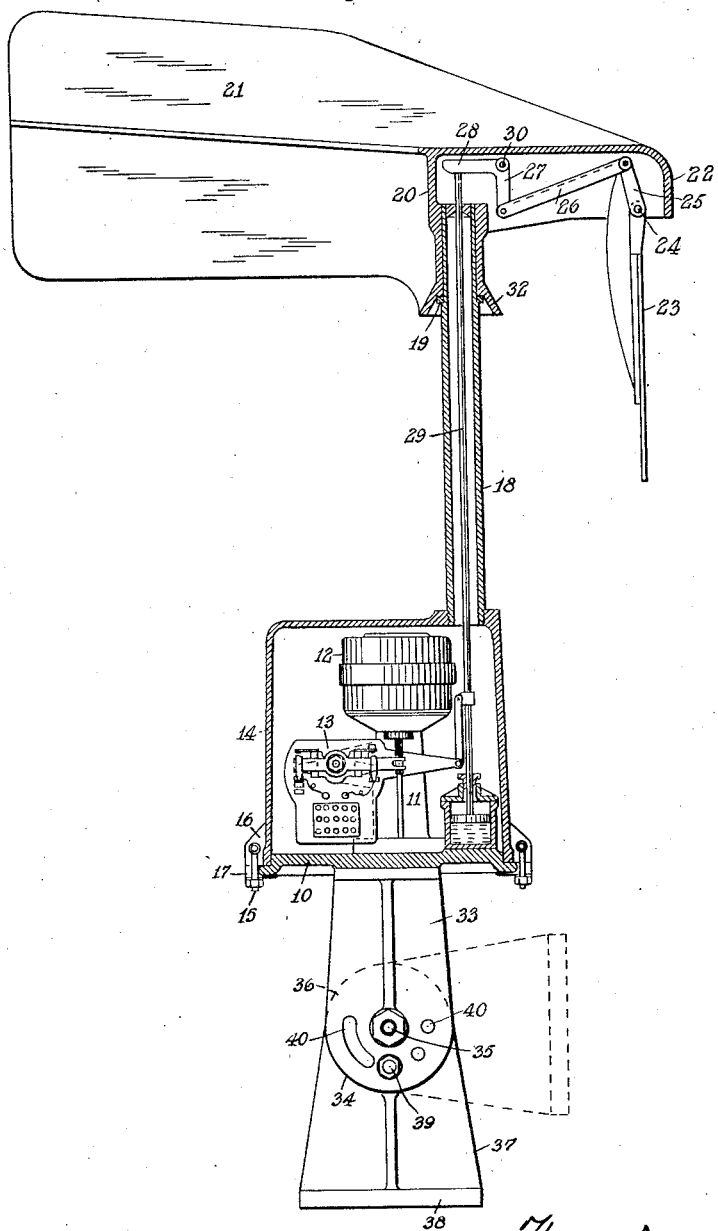
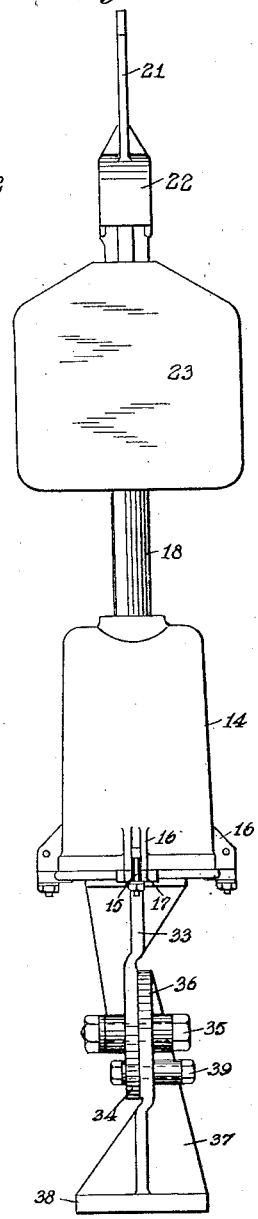

June 16, 1936.  H. J. SMITH  2,044,128
WEATHER INTEGRATOR
Filed Feb. 24, 1933  2 Sheets-Sheet 2

Hazon J. Smith
INVENTOR
BY Wm. S. Pritchard
ATTORNEY

Patented June 16, 1936

2,044,128

UNITED STATES PATENT OFFICE 2,044,128

WEATHER INTEGRATOR

Hazor J. Smith, Springfield, Mass., assignor to Superstat Company, Springfield, Mass., a corporation of Massachusetts Application February 24, 1933, Serial No. 658,382

20 Claims. (Cl. 200—140)

This invention relates to a condition-responsive apparatus, and more particularly to an apparatus responsive to the combined effect of a plurality of separate factors of the condition.

The invention is particularly applicable to the control of a heat supply system in response to the various factors which determine the heat requirements, such as the outside temperature, wind velocity and sunlight.

It is accordingly an object of the present invention to provide a condition-responsive device which integrates the effects of the various factors determining the condition.

Another object is to provide a weather integrating device.

A more specific object is to provide a control device responsive to outside temperature modified by the effects of sunlight and wind velocity on the heat requirements.

A still further object of the invention is to provide a sensitive, convenient and dependable apparatus of the type above indicated.

The invention also consists in certain new and original types of construction and combinations of parts hereinafter set forth and claimed.

Although the novel features which are believed to be characteristic of this invention will be particularly pointed out in the claims appended hereto, the invention itself, as to its objects and advantages and the manner in which it may be carried out, may be better understood by referring to the following description taken in connection with the accompanying drawings forming a part thereof, in the various figures of which like reference characters have been used to designate like parts.

In the drawings which illustrate certain embodiments of the invention:

Figure 1 is a side elevation, partly in section, of the weather integrator;

Figure 2 is a front elevation of the device shown in Figure 1;

Figure 5:
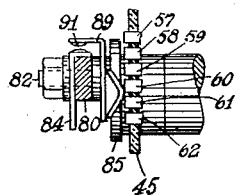
Figure 5 is a section taken on the line 5—5 of Figure 3.

Referring to the embodiment of the invention disclosed in the drawings, the weather integrator is illustrated as comprising a base 10 carrying a bracket 11, which supports a temperature-responsive device 12 and a control switch 13, to be described. The base 10 also supports a housing 14, which is secured thereto in any suitable way, for example, by bolts 15, pivoted in lugs 16 on the housing 14 and cooperating with lugs 17 on the base 10. The housing 14 is preferably formed of comparatively thick metal, which is capable of absorbing a substantial quantity of heat from the sun's rays and of transferring the heat thus absorbed to the temperature-responsive device 12. An elongated tubular member 18 is threaded or otherwise secured to the housing 14 and carries a bearing 19 on which a wind vane housing 20 is rotatably mounted. The housing 20 is formed at its rear end with a vertical direction vane 21 and at its front end carries a shield 22 within which a wind-pressure vane 23 is pivoted, as by pivot 24. The wind-pressure vane extends normal to the plane of the direction vane 21, whereby the vane 23 may be moved about the pivot 24 in response to the wind pressure on the surface thereof.

The vane 23 carries a lever 25, which is connected by a link 26 to a bell-crank lever 27 pivoted to the shield 22 by a pivot 30 and having an arm 28 engaging a plunger 29, which extends through the tubular member 18. The housing 20 is provided with a hood 32 by which the bearing 19 and the interior of the housing 14 are protected from the elements. The wind-vane housing 20 is free to rotate on the member 18 so that the direction vane 21 can at all times maintain the wind-pressure vane 23 normal to the wind direction.

The base 10 may be supported by a bracket 33 having a bearing section 34 which is pivoted by a bolt 35 to a bearing section 36 of a second bracket 37 having a flange 38 adapted to be attached to a suitable support, such as the outside wall of a building (not shown). The brackets 33 and 37 may be pivotally adjusted about the bolt 35 and clamped by a second bolt 39 extending through suitable apertures 40 in the bearing section 34.

Figure 4:
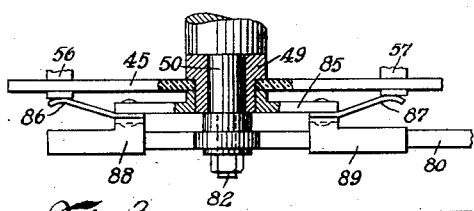
Figure 4 is a detail view of the control switch.
Figure 3:
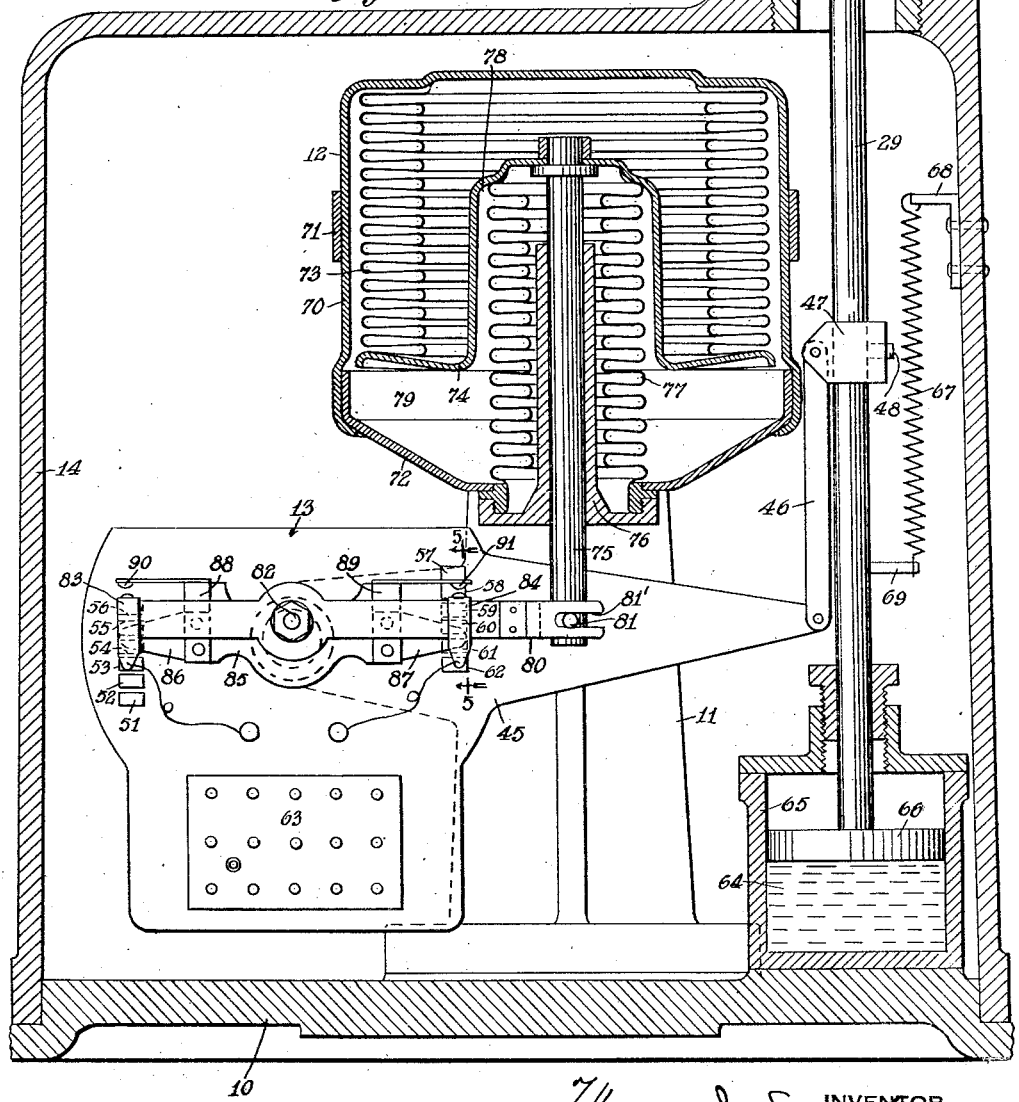
Figure 3 is a longitudinal sectional view of the temperature-responsive element and the control switch.

Referring to Figures 3—5, the control switch 13 is shown as including a switch plate 45, which is connected to the plunger 29 by means of a link 46 and a collar 47 having a set screw 48. The plate 45 is pivoted by a bushing 49 about a pin 50, which is secured to the bracket 11. The plate 45 carries a set of hot contacts 51—56 and a set of cold contacts 57—62, which are connected by suitable connecting means (not shown) to a multiple socket 63.

The plunger 29 at its lower end is connected to a dash pot 64, comprising a cylinder 65 and a piston 66, which is adapted to operate in oil or other suitable medium for damping purposes.

A spring 67 is anchored between a bracket 68, secured to the housing 14, and a pin 69, carried by the plunger 29, and is adapted normally to maintain the plunger 29 in an elevated position but to permit said plunger to be depressed in response to movement of the wind-pressure vane 23 which is caused by wind pressure thereon.

The spring 67 which resists the downward movement of the plunger 29 is arranged to have a modulus approximately equal to the curve of added heat demand for wind velocity. This curve is a combined curve of low increase up to approximately 15 miles per hour and of rapid increase between approximately 15 and 40 miles per hour, flattening out somewhat above this figure. The device is accordingly constructed to translate the wind velocity into motion of the switch plate 45 according to this curve, and may have approximately 40 miles per hour wind velocity as the top limit.

The temperature-responsive device 12 comprises a housing 70, which is mounted on the bracket 11 by suitable means, such as a clamp 71, and is sealed by a cap 72 which may snap into engagement therewith. An expansible metallic bellows 73, having a comparatively stiff cover 74 hermetically sealed thereto to form a variable pressure chamber, is mounted within the housing 70. A plunger 75 is rigidly secured to the cover 74 and extends through a bushing 76 carried by the cap 72. A second metallic bellows 77 is seated in a recess 78 in the cover 74 and is secured between the cap 72 and the plunger 75 to form a glandless seal for the plunger. The bellows 77 also serves, in conjunction with the cover 74 and the bellows 73, to form a hermetically sealed balancing chamber 79 within the housing 70 and external to the bellows 73.

The bellows 73 is preferably charged with a substance having a substantial change in vapor pressure within the temperature range involved in the operation of the device. The amount of the charge is preferably such that the vapor remains saturated only throughout the operating range, inasmuch as the differential change in vapor pressure of the saturated vapor with respect to temperature is greater than the differential change in gas pressure of the unsaturated vapor.

Various substances may be employed for this purpose, depending upon the operating range of the instrument. Methyl chloride has been found suitable for an outdoor thermostat. Isobutane, butane, ethyl chloride, sulphuric ether, carbon tetrachloride and alcohol are examples of other substances which may be used at appropriate operating ranges.

The relationship between the size, gas pressure and change of volume of the balancing chamber 79 is preferably such that the pressure-volume curve of the gas within the chamber follows the pressure-temperature curve of the substance within the bellows 73. Adjustment for this purpose may be made by varying the ratio of the maximum and minimum volumes of the chamber 79 in the selected operating range of the device. In one embodiment of the invention, this is accomplished by introducing a quantity of a liquid, such as alcohol, into the chamber. The liquid decreases the effective volume of the chamber without changing the flexibility of the bellows and thereby increases the volume ratio of the chamber. By this means, the minimum volume may be adapted to any desired operating range.

The liquid may be introduced by any suitable means (not shown).

The arrangement is such that the internal pressure within the bellows 73 does not differ greatly from the internal pressure within the chamber 79. It is possible, therefore, to utilize a bellows of extreme sensitivity because of the relatively small pressure differential to which it is subjected. The bellows 73 may accordingly be formed with a comparatively thin wall and may be made much more flexible and sensitive than would be the case if it were exposed externally to the atmosphere. The bellows 77 is of small diameter and of comparatively great length and may accordingly be made to withstand the difference between the pressure in the chamber 79 and the pressure of the outside atmosphere without being unduly rigid.

With a gain in temperature, the pressure of the methyl chloride or other substance within the bellows 73 rises and the bellows expands to equalize this pressure against the pressure in the chamber 79, thereby producing a downward motion of the plunger 75. Upon a fall in temperature, the reverse action takes place.

The plunger 75 is connected to a lever 80, as by a pin 81 engaging the slot 81' in said lever. The lever 80 is pivoted about an eccentric stud 82 on the pin 50 and carries a pair of contact members 83 and 84. A switch arm 85 is pivoted about the bushing 49 on the pin 50 and carries contact brushes 86 and 87 adapted to engage hot contacts 51—56 and cold contacts 57—62 respectively. The brushes 86 and 87 are connected to conductors 88 and 89, which in turn are connected to contacts 90 and 91 respectively. Contacts 90 and 91 are adapted to engage the contacts 83 and 84 respectively of the lever 80 to form a reversing switch.

It will be noted that movement of the plunger 75 causes pivotal movement of the lever 80, thereby closing contacts 83 and 90 or contacts 84 and 91, depending upon the direction of movement. After one of the above sets of contacts has been closed, further movement of the lever 80 causes pivotal movement of the arm 85 and thereby causes the brushes 86 and 87 to move over the hot and cold contacts carried on the plate 45. The eccentric mounting of the lever 80 with respect to the arm 85 produces a wiping action between the contacts 83 and 84 and the contacts 90 and 91 respectively, adapted to maintain the contacts in clean condition.

In the embodiment disclosed, the relationship between the parts is such that the plunger 75 is capable of a range of movement corresponding to a part only of the hot and cold contacts. The remaining hot and cold contacts are brought into operation by movement of the plate 45 caused by movement of the plunger 29 in response to wind pressure exerted upon the vane 23. It is obvious that the relationship between the movement of the plunger 75 and of the plunger 29 may be varied and the operating range of the instrument may be likewise varied. The operating range of the instrument may be adjusted by any suitable means such as, for example, by varying the position of the housing 70 in the clamp 71. The dash pot 64 preferably retards the movement of the plunger 29 sufficiently to prevent short gusts of wind or minor variations in wind pressure from affecting the device and renders the device responsive only to sustained changes in wind pressure.

The bellows 73 is normally responsive to temperature variations in the surrounding medium. If, in addition, the device is so located that the housing 14 is exposed to the rays of the sun, radiant heat will be absorbed by said housing and transferred to the air within the housing, which is correspondingly heated and exerts an influence upon the action of the bellows 73. If the above-described mechanism is mounted on the outside of a building in such a position that the vane 23 is exposed to the wind and the housing 14 is exposed to the direct rays of the sun, it is evident that the combined effect of wind, outside temperature and sunlight will be integrated by the device and will determine the position of the brushes 86 and 87 with respect to the hot and cold contacts 51—56 and 57—62 respectively.

The hot and cold contacts constitute progressive switch means which, in connection with the reversing switch contacts, are adapted to be connected by the multiple socket 63 to a reversible motor-operated control means of any desired type, such, for example, as described in my copending application Serial No. 657,237, in which a motor-operated means assumes a position determined by the position of the brushes 86 and 87 with respect to their cooperating contacts. Obviously, the device may be used with any desired control which may be mechanically taken, for example, directly from the plungers 29 and 75. The switch mechanism is shown by way of illustration only.

In the operation of the above-described mechanism, an increase in temperature causes bellows 73 to expand, thereby causing downward movement of the plunger 75 and clockwise movement of the lever 80. This movement of the lever 80 first causes the contacts 83 and 90 to close and then, by the force exerted on the contact 90 by the contact 83, causes clockwise movement of the arm 85 and thereby causes the brushes 86 and 87 to progressively engage the corresponding sets of contacts 51—56 and 57—62 in the order named.

When the plate 45 is in its normal position, corresponding to zero wind pressure on the vane 23, the brushes 86 and 87 are adapted to engage the contacts 53—56 and 59—62. Wind pressure on the vane 23, however, depresses the plunger 29 and thereby causes clockwise movement of the plate 45 and brings the contacts 51 and 52 and the contacts 57 and 58 within the operating range of the brushes 86 and 87.

The above-described device is responsive to the outside temperature alone on a windless night. When exposed to the sunlight, however, the direct rays of the sun raise the temperature of the housing 14 an amount determined by the difference between the absorbed radiant heat and the loss due to convection to the surrounding air. The residual effect is passed to the air within the housing and causes the operation of the bellows 73 to be modified by an amount proportional to the heating effect of the sunlight. These two factors, together with the wind velocity, are thus integrated to provide a simple and accurate weather-responsive device which may be used, for example, in connection with a central heating plant supplying a plurality of buildings or supplying a large building, the different parts of which are exposed to different weather conditions.

As applied to a building or to a building unit, the device may be used to control a heat supply in accordance with outside weather conditions so as to meet the heat requirements of the day and to maintain a substantially constant inside temperature without changing the setting of the individual radiators.

Although certain embodiments of the invention have been disclosed for purposes of illustration, it is to be noted that the various parts thereof may be varied without departing from the spirit of the invention and that the invention is only to be limited in accordance with the following claims when interpreted in view of the prior art.

I claim:

1. A weather integrator comprising a thermostatic element and means to protect said thermostatic element from the weather and to modify the action of said thermostatic element due to the effect of radiant heat from the sun's rays, said means comprising a metal housing sufficiently thick to absorb radiant heat from the sun's rays and to retain a portion of the heat thus absorbed which is proportional to the heating effect of the sun's rays and to transfer said portion to said thermostatic element to modify the action thereof so as to compensate for the effect of sunlight and to dissipate the balance of the absorbed heat to the surrounding air.

2. A weather integrator comprising a thermostatic element, a housing therefor adapted to protect said element from the weather, said housing being adapted to absorb radiant heat from the sun's rays for modifying the action of said thermostatic element, and wind-operated means for further modifying the action of said thermostatic element.

3. A weather integrator comprising a control mechanism, a thermostatic element adapted to actuate the same, a housing surrounding said thermostatic element and adapted to be exposed to sunlight, a wind-pressure vane associated with said housing, and means actuated by said wind-pressure vane for modifying the action of said control means.

4. A weather integrator comprising a control mechanism, a thermostatic element adapted to actuate the same, a housing surrounding said thermostatic element and adapted to be exposed to sunlight, a wind-pressure vane associated with said housing, means actuated by said wind-pressure vane for modifying the action of said control means, and means to maintain said wind-pressure vane in operative position with respect to the direction of wind.

5. In combination, a thermostatic element, control means operated thereby, a support for said control means, and wind-actuated means for varying the position of said support.

6. In combination, a thermostatic element, switch means operated thereby, contacts associated with said switch means, a support for said contacts, and wind-operated means for varying the position of said contacts with respect to said switch means.

7. A weather integrator comprising reversing switch means and progressive switch means, thermostatic means to operate both of said switch means, and means responsive to wind-pressure adapted to modify the operation of said switch means.

8. A weather-responsive device comprising progressive control means, temperature-responsive means adapted to operate said progressive control means, and means responsive to wind-pressure adapted to modify the operation of said progressive control means.

9. In combination, temperature-responsive means, and means responsive to wind velocity adapted to modify the operation of said first means.

10. A weather-responsive device comprising a temperature-responsive element, a support therefor, means responsive to wind pressure adapted to modify the action of said temperature-responsive element, means for mounting said last means on said support for pivotal movement in a horizontal plane, and wind-operated means for maintaining said pressure-responsive means normal to the wind direction.

11. A control device comprising a support, a housing pivotally mounted on said support for movement in a horizontal plane, a wind-pressure vane pivotally mounted on said housing and adapted for limited pivotal movement proportional to the wind pressure thereon, and a direction vane associated with said housing and adapted to maintain said wind-pressure vane normal to the direction of the wind.

12. A weather-responsive device comprising thermostatic means, a housing for said means having an upwardly extending member, a bearing carried by said member, a wind-pressure vane rotatably supported by said bearing and adapted to modify the action of said thermostatic means in response to wind pressure, and a shield associated with said wind-pressure vane, said shield extending over said bearing and being adapted to protect the same from the weather conditions.

13. A weather-responsive device comprising thermostatic means, control means operated thereby, a housing surrounding said thermostatic means, means for modifying the action of said control means comprising a plunger extending through said housing, and wind-operated means adapted to actuate said plunger, said wind-actuated means being pivotally mounted on said housing.

14. In combination, a thermostatic element, control means operated thereby, a plate supporting said control means, and wind-operated means adapted to vary the position of said plate in response to variations in wind pressure.

15. In combination, a thermostatic element, control means operated thereby, a pivoted plate carrying said control means, and wind-operated means adapted to vary the position of said pivoted plate.

16. In combination, a thermostatic element, control means operated thereby, a pivoted plate carrying said control means, a housing surrounding said thermostatic element and said plate, a plunger adapted to control the position of said plate and extending through said housing, a wind-pressure vane, and means operated by said wind-pressure vane for actuating said plunger in response to variations in wind pressure.

17. In combination, a thermostatic element, control means operated thereby, a pivoted plate carrying said control means, a housing surrounding said thermostatic element and said plate, a plunger adapted to control the position of said plate and extending through said housing, a wind-pressure vane pivotally mounted on said housing concentric with said plunger, and means operated by said wind-pressure vane for actuating said plunger in response to variations in wind pressure.

18. In combination, a thermostatic element, control means operated thereby, a pivoted plate carrying said control means, a housing surrounding said thermostatic element and said plate, a plunger adapted to control the position of said plate and extending through said housing, a wind-pressure vane pivotally mounted on said housing concentric with said plunger, a direction vane adapted to maintain said wind-pressure vane in the path of the wind, means operatively interconnecting said wind-pressure vane and said plunger, and means to constrain said plunger for movement proportional to the added heat requirements caused by the wind.

19. In combination, temperature-responsive means, means responsive to wind velocity adapted to modify the operation of said first means, and means responsive to the heat of the sun's rays to further modify the operation of said first means.

20. A weather-responsive device comprising progressive control means, temperature-responsive means adapted to operate said progressive control means, and means responsive to the combined effect of wind and sunlight adapted to modify the operation of said progressive control means.

HAZOR J. SMITH.